Patented Nov. 4, 1930

1,780,320

UNITED STATES PATENT OFFICE

ERIC ALFRED SPEIGHT, OF BLACKLEY, MANCHESTER, ENGLAND, ASSIGNOR TO IMPERIAL CHEMICAL INDUSTRIES LIMITED, OF LONDON, ENGLAND

DYEING OF CELLULOSE ESTERS AND ETHERS

No Drawing. Application filed April 27, 1929, Serial No. 358,766, and in Great Britain May 30, 1928.

This invention relates to the dyeing of cellulose esters and ethers, and particularly to the production of black shades on material consisting of or containing these. As is well known black shades are very difficult to obtain by the direct dyeing of acetate silk or similar material with azo dyes and it is usual to produce blacks by impregnating the material with amines or aminoazo-compounds, then diazotizing on the fibre and developing with compounds such as 2:3-hydroxy-naphthoic acid.

I have now discovered that this tedious and costly method may be avoided and full black shades on cellulose ester or ether silks may be obtained by direct dyeing with certain secondary disazo dyes of specially selected constitution, now to be defined.

These secondary dyes may be represented by the following general formula

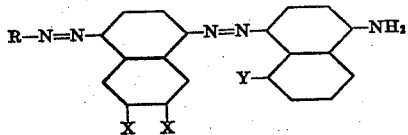

wherein one X represents hydrogen and the other X represents hydrogen or a sulphonic group, R represents the coupled residue derived from diazotized amines of the class comprising aniline and the homologues and halogenated derivatives of the same, and Y represents an OH or $NH_2$ group. Dyes of this type may be made by diazotizing aniline or equivalent amine, for instance toluidine, xylidine, chloro-aniline, chloro-toluidine, etc., and coupling with alpha-naphthylamine or the 6 or 7 sulphonic derivative thereof. The amino azo compound thus formed is diazotized and coupled with 1:5-naphthyldiamine or 1:5-aminonaphthol to form the disazo dye.

These secondary disazo dyes directly dye cellulose ester or ether silks in full black shades. They possess an excellent affinity for artificial silks.

If the middle component of the above class of secondary dyes is derived from either alpha-naphthylamine-6-sulphonic acid or alpha-naphthylamine-7-sulphonic acid, the resulting dyes are advantageous, in that they are freely soluble in water. The presence of the sulphonic group attached to the middle component residue does not diminish the excellent affinity for cellulose ether or ester silks, possessed by this general class of dyes.

I have found that where a halogenated arylamine is used as first component it is in many cases preferable to employ the 1:5-naphthylenediamine instead of the 1:5-aminonaphthol as end-component in order to obtain dyestuffs of highest affinity, depth of shade and fastness properties.

Dyes of this general type are mentioned amongst a very large number of other disazo dyes in British Patent No. 2,718/1892 for the dyeing of wool but so far as I am aware none of the dyes I describe has ever found practical application and it has not hitherto been known that by their use valuable black shades can be directly produced on cellulose esters and ethers.

My invention is illustrated but not limited by the following examples, the parts being by weight.

*Example 1.*—93 parts of aniline are diazotized and combined with 223 parts of the technical mixture of Cleve acids (α-naphthylamine-6- or 7-sulphonic acid) and rediazotized in the known manner. This diazo-azo compound is combined in the usual way with 159 parts of 1:5-aminonaphthol in a medium which is acid with mineral acid or acetic acid and the resulting dyestuff is isolated by salting out after making slightly alkaline with sodium carbonate. When dry the dyestuff forms a black powder freely soluble in warm water to give a deep violet solution which becomes somewhat bluer in tone on addition of either ammonia or caustic soda solution. Addition of hydrochloric acid to the aqueous solution produces a black precipitate. The dry powder dissolves in concentrated sulphuric acid to give a violet solution from which a violet precipitate is obtained on dilution with water.

The dye has in the form of its free acid the probable formula

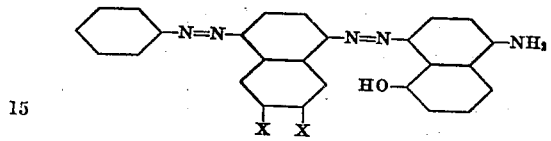

wherein one X represents hydrogen and the other X represents a sulphonic group.

The dyebath is made up by dissolving 25 parts of the dry powder in hot water and dilution to about 2500 parts by the addition of cold water and about 10 parts of common salt are added. 100 parts of the acetate silk material are entered into the lukewarm dyebath which is then gradually raised to about 75° C. Dyeing is carried out at this temperature for about 1 hour, two lots of 10 parts of salt being added at intervals. The acetate silk is then removed, washed well and dried. The resulting dyeing is a deep blue-black shade, fast to washing, acids alkalies and to light.

*Example 2.*—93 parts of aniline are diazotized and combined with 143 parts of α-naphthylamine, rediazotized and combined with 159 parts of 1:5-aminonaphthol in a medium acid with acetic or mineral acid and the resulting dyestuff is filtered off and washed to remove inorganic salts. Dispersing agents, for example, sulphite cellulose lye may be present during coupling if desired. The dyestuff paste so obtained yields when dried, a black-powder insoluble in water but soluble in concentrated sulphuric acid to a violet solution which yields a violet precipitate on dilution with cold water.

The dye has the formula given in Example 1 with the sulphonic group removed.

The dyebath is made up by suspending 50 parts of the dyestuff paste in warm water, with addition of a suitable dispersing agent such as the condensation product of formaldehyde with sulphonated naphthalene described in British Patent No. 224,077 and diluting with water to about 2500 parts. 100 parts of acetate silk are entered into the lukewarm dyebath which is then gradually heated up to about 75° C. Dyeing is carried out at this temperature for 1 hour, after which the acetate silk is removed, washed well and dried. The silk is dyed a deep violet-black shade.

*Example 3.*—93 parts of aniline are diazotized, combined with 223 parts of the technical mixture of Cleve acids (α-naphthylamine-6- or 7-sulphonic acids) and rediazotized in the known manner. The resulting diazo-azo-compound is combined in the usual way with 158 parts of 1:5-naphthylenediamine in a medium which may be slightly acid with acetic acid or slightly alkaline with sodium carbonate. The mixture is finally rendered slightly alkaline by addition of sodium carbonate, if necessary, and the dyestuff isolated by salting out. When dry it forms a black powder freely soluble in warm water to give a brownish solution almost unaltered by addition of ammonia or caustic soda but from which a black precipitate is thrown down by addition of hydrochloric acid. The dry powder dissolves in concentrated sulphuric acid to give a violet solution from which a violet precipitate is formed by dilution with cold water.

The dye, in the form of its free acid, has the formula given in Example 1 with the substitution of $NH_2$ for the OH in the third component.

The dyebath is made up and dyeing is carried out exactly as described in Example 1 whereby the acetate silk is dyed a deep brownish black shade.

*Example 4.*—93 parts of aniline are diazotized and combined with 143 parts of α-naphthylamine, rediazotized and combined with 158 parts of 1:5-naphthylenediamine in a medium slightly acid with acetic acid and the resulting dyestuff is filtered off and washed to remove inorganic salts. Dispersing agents, for example sulphite cellulose lye, may be present during coupling if desired. The dyestuff paste yields, when dried, a black powder insoluble in water but soluble in concentrated sulphuric acid to give a violet solution which deposits a violet precipitate on dilution with cold water.

The dye has the same formula as the dye of Example 3, with the sulphonic group removed.

The dyebath is made up and dyeing is conducted exactly as described in Example 3, whereby the acetate silk is dyed a brownish black shade.

My invention is further illustrated but not limited by the following examples.

| Dyestuff from | | | Shade on acetate silk |
|---|---|---|---|
| 1st component | 2nd component | 3rd component | |
| o-toluidine | Cleve acid | 1:5-aminonapthol | Blue-black |
| m-xylidine | Cleve acid | 1:5-aminonapthol | Brown-black |
| p-toluidine | Cleve acid | 1:5-aminonapthol | Brownish-black |
| 5-chloro-2-toluidine | Cleve acid | 1:5-aminonapthol | Purplish-black |
| o-toluidine | Cleve acid | 1:5-naphthylenediamine | Black |
| m-xylidine | Cleve acid | 1:5-naphthylenediamine | Black |
| p-chloroaniline | Cleve acid | 1:5-naphthylenediamine | Greenish-black |

What I claim and desire to secure by Letters Patent is:—

1. A process for the production of black shades on cellulose esters or ethers which comprises the application to the fibre of a disazo dye having the general formula:

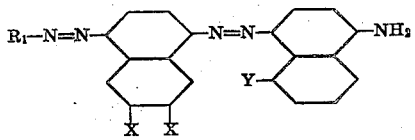

wherein one X represents hydrogen and the other X represents hydrogen or a sulphonic group, $R_1$ represents a benzene residue free from sulphonic and carboxylic groups, and Y represents an auxochromic salt-forming group.

2. A process for the production of black shades on cellulose esters or ethers which comprises the application to the fibre of a disazo dye having the general formula:

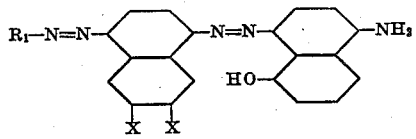

wherein one X represents hydrogen and the other X represents hydrogen or a sulphonic group, and $R_1$ represents a benzene residue free from sulphonic and carboxylic groups.

3. A process for the production of black shades on cellulose esters or ethers which comprises the application to the fibre of the disazo dye having in the form of its free acid the formula:

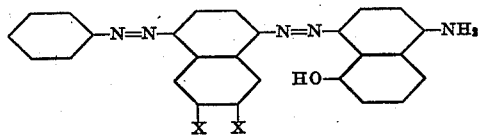

wherein one X represents hydrogen and the other X represents a sulphonic group.

4. Cellulose esters or ethers dyed by the process claimed in claim 1.

5. Cellulose esters or ethers dyed by the process claimed in claim 2.

6. Cellulose esters or ethers dyed by the process claimed in claim 3.

7. In the production of full black shades on cellulose ester or ether materials, the process which comprises applying to said materials a disazo dye having the probable general formula

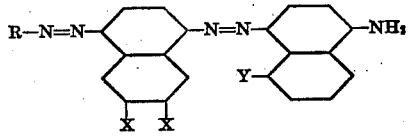

wherein R represents the coupled residue derived from a diazotized amine of the class consisting of aniline and the homologues and halogenated derivatives of the same, one X represents hydrogen and the other X represents hydrogen or a sulphonic group and Y represents an OH or $NH_2$ group and directly dyeing said material in full black shades.

8. Cellulose ester or ether materials directly dyed with a disazo dye having the probable general formula

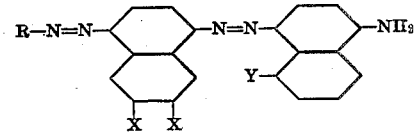

wherein R represents the coupled residue derived from a diazotized amine of the class consisting of aniline and the homologues and halogenated derivatives of the same, one X represents hydrogen and the other X represents hydrogen or a sulphonic group and Y represents an OH or $NH_2$ group, the said dyed material having a full black shade.

In testimony whereof I affix my signature.

ERIC ALFRED SPEIGHT.